(12) United States Patent
Byrd

(10) Patent No.: US 6,892,832 B2
(45) Date of Patent: May 17, 2005

US006892832B2

(54) BREAKABLE WASHER EARTH BORING BIT

(75) Inventor: Christopher S. Byrd, Dallas, TX (US)

(73) Assignee: Varel International, Ltd., Carrollton, TX (US)

( * ) Notice: Subject to any disclaimer, the term of this patent is extended or adjusted under 35 U.S.C. 154(b) by 0 days.

(21) Appl. No.: 10/294,110

(22) Filed: Nov. 13, 2002

(65) Prior Publication Data

US 2003/0094312 A1 May 22, 2003

Related U.S. Application Data

(60) Provisional application No. 60/346,227, filed on Nov. 16, 2001.

(51) Int. Cl.$^7$ .......................... E21B 17/06; E21B 17/10
(52) U.S. Cl. .............................. 175/325.2; 175/325.5; 411/156; 411/160; 411/531
(58) Field of Search ................................ 411/160, 155, 411/156, 537, 10, 538, 531; 175/325.2, 325.4, 325.5

(56) References Cited

U.S. PATENT DOCUMENTS

| | | | |
|---|---|---|---|
| 2,022,101 A | | 11/1935 | Wright ........................ 255/61 |
| 2,562,346 A | | 7/1951 | Whittaker ..................... 255/73 |
| 4,060,286 A | * | 11/1977 | Boice ....................... 175/325.4 |
| 4,064,785 A | * | 12/1977 | Graham et al. ............... 411/10 |
| 4,715,756 A | * | 12/1987 | Danico et al. .............. 411/369 |
| 5,011,351 A | * | 4/1991 | Terry .......................... 411/144 |
| 5,058,689 A | * | 10/1991 | Collinsworth ............ 175/325.4 |
| 5,222,565 A | | 6/1993 | Collinsworth ............... 175/320 |
| 5,234,063 A | | 8/1993 | Collinsworth ............ 175/325.2 |
| 5,390,749 A | | 2/1995 | Lyon ........................... 175/296 |
| 5,586,851 A | * | 12/1996 | Haage .......................... 441/10 |
| 5,803,194 A | * | 9/1998 | Rowlett .................... 175/325.2 |
| 6,135,687 A | * | 10/2000 | Leek et al. .................... 411/10 |
| 6,247,883 B1 | * | 6/2001 | Monserratt ................... 411/34 |

FOREIGN PATENT DOCUMENTS

EP    0 286 373    10/1988    ........... E21B/17/06

* cited by examiner

*Primary Examiner*—David Bagnell
*Assistant Examiner*—T. Shane Bomar
(74) *Attorney, Agent, or Firm*—Baker Botts L.L.P.

(57) ABSTRACT

A drill bit is assembled to the makeup end of a drill string by means of a breakable washer comprising a ring-shaped body having an inner diameter and an outer diameter. A radially extending first surface of the ring-shaped body is planar and substantially perpendicular to a centerline axis through the body. A second radially extending surface has an angle with reference to the first surface that results in a radially diverging configuration.

39 Claims, 3 Drawing Sheets

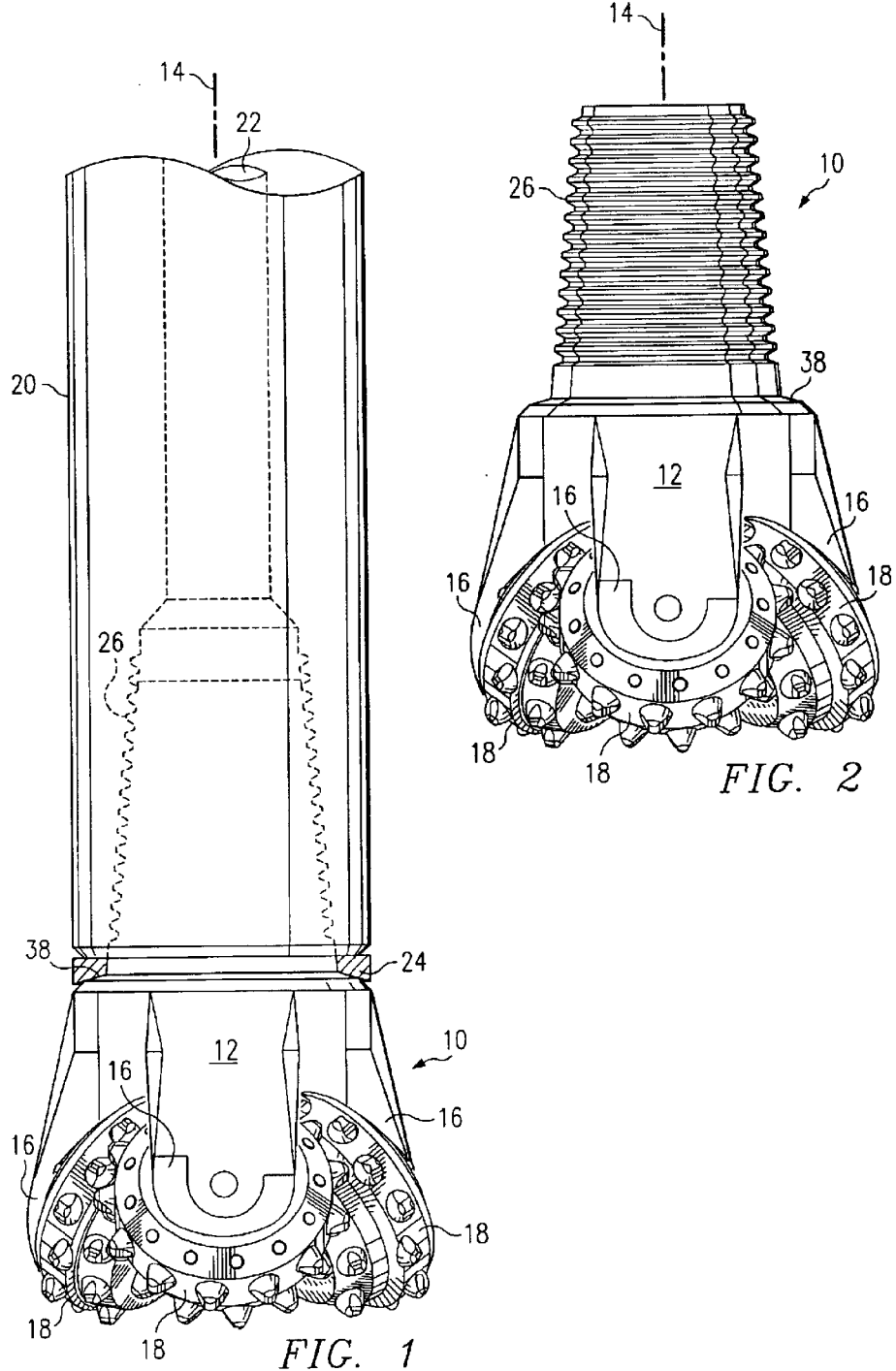

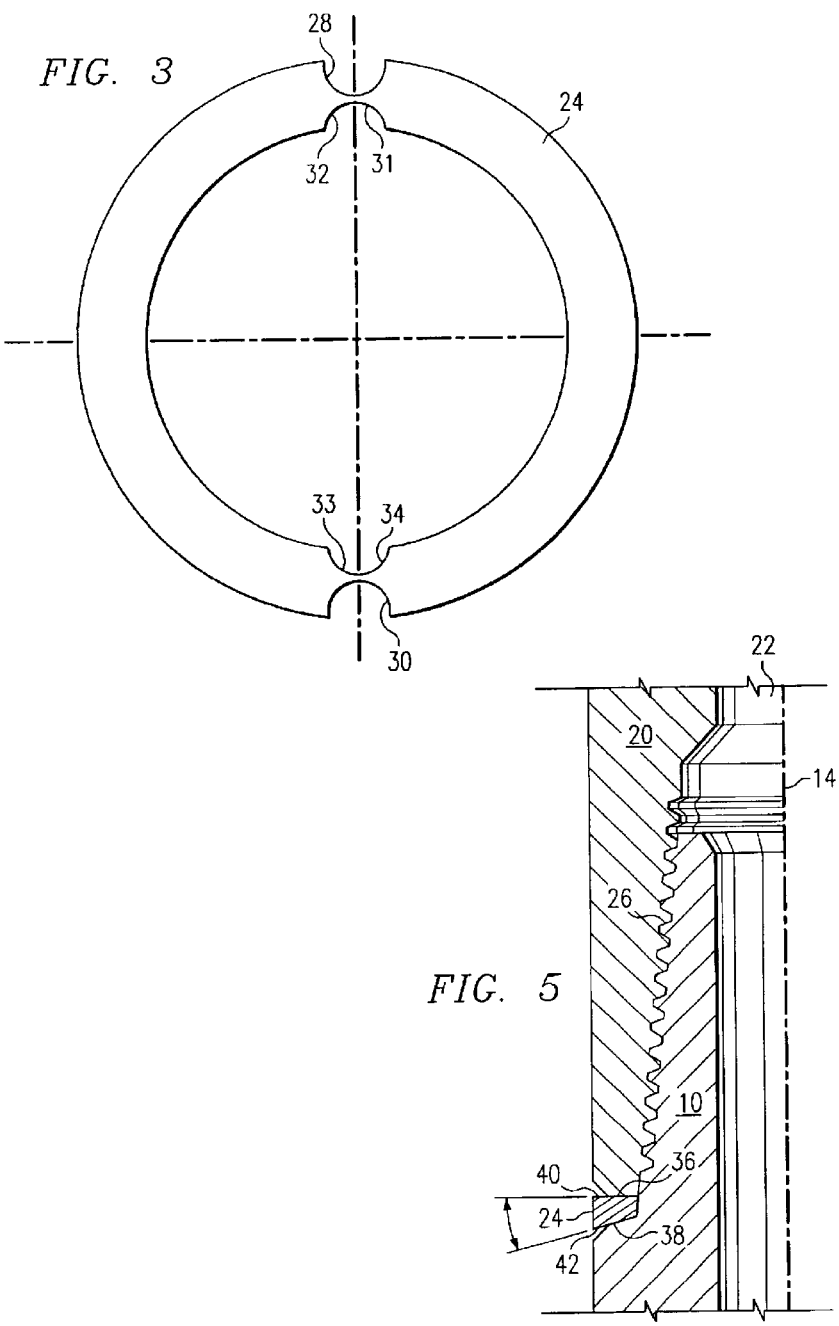

BREAKABLE WASHER EARTH BORING BIT

RELATED APPLICATION

This application claims the benefit of U.S. provisional application Ser. No. 60/346,227, filed Nov. 16, 2001, entitled Breakable Washer Earth Boring Bit.

TECHNICAL FIELD OF THE INVENTION

This invention relates to earth boring bits and more particularly, to earth boring bits and a breakable washer for facilitating removal of the earth boring bit from a drill string.

BACKGROUND OF THE INVENTION

Conventional earth boring bits have an integral threaded pin for attachment of the bit to a drill string. The screw threads of the threaded pin and of the drill string have an orientation such that the various connections all tend to be tightened by the rotary motion of the bit during drilling operation. If the bit was not properly tightened at installation, this tends to result in over tightening of the drill bit to the drill string. When the over-tightened bit is expended there may be significant difficulty in removing the bit from the drill string. Various techniques have been used to remove an over-tightened bit including use of an oxygen/acetylene torch to heat the threaded connection in an attempt to release the over-tightened bit from the drill string. This is a time consuming operation and many times results in significant down time for a rig. Another often used technique is to use a sledge hammer in an attempt to loosen the drill bit from the over-tightened condition. This bit removal problem has always been a serious one and very little effort has been directed to finding an acceptable solution.

U.S. Pat. No. 5,234,063 describes a break-out ring for mounting on a circular surface of a drill bit at the connecting pin to facilitate removal of the over-tightened bit from the drill string. However, the break-out ring described in this United States patent has parallel surfaces and when assembled between a shoulder of the drill bit and a special bit sub required for installation of the drill bit there is little improvement for removal of the bit. The break-out ring of this patent is described as having weakened portions to facilitate removal of the ring thereby releasing the over-tightened drill bit from the drill string. Because of the parallel surfaces of the break-out ring there is considerable difficulty in removing the ring to release the over-tightened drill bit. The parallel surfaces of the break-out ring becomes a part of the over-tightened connection and requires considerable force for removal from between the drill bit and the drill string.

Thus there is a need for a breakable washer for assembly between a drill bit and the standard connection of a drill string that enables removal of a drill bit in an over-tightened condition without destruction of the drill bit, and with relative ease.

SUMMARY OF THE INVENTION

In accordance with the present invention, there is provided a breakable washer to facilitate removal of an earth boring bit or other tool when the connection with a drill string has been over-tightened or when there is not means available to loosen the bit. The breakable washer of the present invention provides for removal of a drill bit when equipment is not available to apply sufficient break-out torque. When assembled, the surfaces of the breakable washer are positioned between the mating surfaces of the threaded connection between the earth boring bit, or other tool, and the standard receiver of a drill string.

To accommodate the breakable washer of the present invention the conventional shoulder of the threaded pin of a drill bit is modified to receive the washer. The combination of the modified threaded pin and the washer comprise the standard geometry to mate with a standard receiving connection of a drill string in accordance with API specifications. The modified earth boring bit and the breakable washer of the present invention make up to a drill string in a conventional manner, with the washer between mating shoulders of the bit and the drill string. The breakable washer has a planar face perpendicular to the axis of the threaded pin and this planar face mates with the planar face of a conventional receiver of a drill string or bit sub. The surface of the breakable washer opposite from the planar face has a conical face. This conical face mates with a matching conical face of the drill bit at the threaded pin. The planar face of the washer combined with the conical face results in a radially diverging cross section for the washer, thinner at the inside diameter and thicker at the outside diameter.

To remove an over-tightened drill bit or other tool the breakable washer of the present invention is broken and driven from between the connecting parts by suitable means such as a hammer and chisel or other tool designed for the purpose. As a result of the conical face only a small movement of the broken washer is required to release the washer from between the mating connecting surfaces.

In accordance with the present invention there is provided apparatus for earth boring comprising a tool for attachment to the conventional makeup end of a drill string wherein the apparatus comprises a tool body having a longitudinal axis and including a makeup end. A tool joint pin extends from and is integral with the makeup end of the tool body and includes a radially extending circumferential surface. The circumferential surface is part of the makeup end of the tool body. The radially circumferential surface extends outward from the tool joint pin to the outer surface of the tool body. The radially-extending surface comprises a conical face at an angle of up to 15 degrees with reference to a surface perpendicular to the longitudinal axis of the tool body. A breakable washer is assembled between the radially extending surface of the tool body and a makeup end of the drill string. The breakable washer has a first surface normal to the longitudinal axis to the tool body and a conical-shaped second surface at an angle of up to 15 degrees with reference to the first surface.

Further in accordance with the present invention there is provided a breakable washer for assembly between a tool and the conventional end of the makeup end of a drill string, wherein the breakable washer comprises a ring shaped body having a first planar surface and a second conical surface such that the breakable washer comprises a radially diverging cross section. Two or more breakout recesses are included in the outer surface of the ring shaped body to facilitate fracturing and removing the washer.

A technical advantage of the present invention is to facilitate removal of a drill bit or other tool from a drill string without the use of heat or excessive forces. This technical feature is achieved by a breakable washer having a radially diverging cross section with one surface planar and a second surface having a conical configuration.

BRIEF DESCRIPTION OF THE DRAWINGS

A more complete understanding of the invention may be had by reference to the following detailed description when taken in conjunction with the accompanying drawings:

FIG. 1 is an elevational view of the breakable washer of the present invention assembled between a drill bit and a conventional receiver of a drill string;

FIG. 2 is an elevational view of the drill bit of FIG. 1 illustrating the modification of the drill bit for use with the breakable washer of the present invention;

FIG. 3 is a plan view of the breakable washer of the present invention;

FIG. 5 is a sectional view of the washer of FIGS. 3 and 4 as assembled between a drill bit and a conventional receiver of a drill string.

DETAILED DESCRIPTION OF THE DRAWINGS

Figure 4:
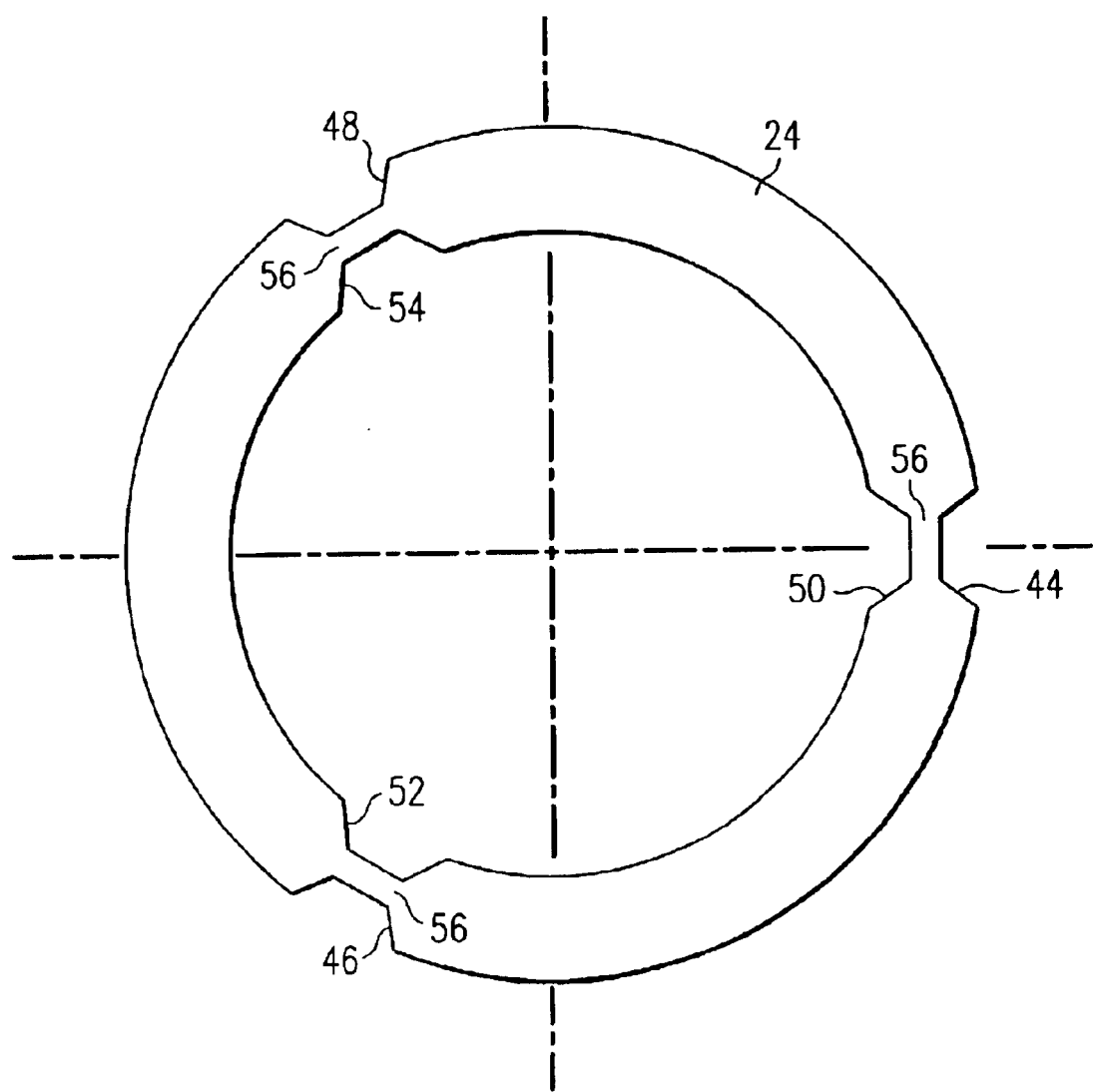
FIG. 4 is a plan view of an alternate embodiment of the breakable washer of the present invention.

Reference is now made to the drawings wherein like reference characters denote like or similar parts throughout the various figures. Although the invention is described with reference to a drill bit as the preferred embodiment, it has utility for use with other tools used for earth boring.

Referring to FIGS. 1 and 2, there is shown a drill stem assembly including a conventional roller cone earth boring bit 10 comprising a body 12 having a longitudinal axis 14. A plurality of journal pins (not shown) extend from the sections 16 of the body 12 for supporting roller cones 18 having conventional inserts arranged in accordance with recognized patterns. Although FIGS. 1 and 2 illustrate a three cone bit it should be understood that the present invention of a breakable washer is not limited to use with such bits but also find utility with drag bits, diamond bits, and other earth boring tools.

The drill bit 10 is threadedly coupled to a conventional makeup end receiver of a drill string 20 illustrated as having a fluid passage 22. Assembled between the drill bit 10 and the makeup end of the drill string 20 is a breakable washer 24 for facilitating removal of the drill bit from the drill string. Again, it should be mentioned that the drill bit 10 may not directly couple to the drill string 20 but may be coupled to a drill bit sub (not shown).

Referring to FIG. 3, there is shown a plan view of the breakable washer 24. As illustrated, the breakable washer 24 has a ring-shaped configuration with an inner diameter slightly larger than the outer diameter of the threaded pin 26 of the drill bit 10. The breakable washer 24 has an outer diameter approximately equal to the diameter of the bit body 12. The outer surface of the breakable washer 24 includes two diametrically opposed semi-circular breakpoint recesses 28 and 30. Similarly, the inner surface of the breakable washer 24 includes two semi-circular diametrically opposed breakpoint recesses 32 and 34. Between the recesses 28 and 32 is a fracture link 31 and between the recesses 30 and 34 there is a fracture link 33. It should be understood that more than two breakpoint recesses may be included in the inner or outer surfaces of the breakable washer 24 and the semi-circular configuration shown in FIG. 3 is exemplary only.

Referring to FIG. 4, there is shown an alternate embodiment of the breakable washer 24. As illustrated in FIG. 4, the breakable washer 24 has a ring-shaped configuration with an inner diameter slightly larger than the outer diameter of the threaded pin 26 of the drill bit 10. The breakable washer 24 has an outer diameter approximately equal to the diameter of the bit body 12. The outer surface of the breakable washer 24 includes three break point recesses 44, 46 and 48 spaced approximately 120 degrees apart. Similarly, the inner surface of the breakable washer 24 includes three break point recesses 50, 52 and 54. The recesses of the breakable washer 24 of FIG. 4 have a configuration of a truncated triangle. Between the recesses 44 and 50 and between the recesses 46 and 52 and similarly between the recesses 48 and 54, there is a fracture link 56. The cross-section configuration of the breakable washer of FIG. 3 and the breakable washer of FIG. 4 is similar.

Referring to FIG. 5, there is shown a cross section of the washer 24 assembled between the conventional makeup end 36 of the drill string 20 and the shoulder 38 of the drill bit 10. The surface of the makeup end 36 is normal to the longitudinal axis 14 and has a substantially ring-shaped configuration similar to the ring-shaped configuration of the breakable washer 24. The shoulder 38 has a conical shape (not necessarily planar) at an angle with reference to the longitudinal axis 14 to mate with a conical-shaped surface of the breakable washer 24.

With reference to the breakable washer 24 as illustrated in FIG. 5, the washer includes a first surface 40 having a planar configuration and normal to the longitudinal axis 14 (centerline axis 35) when installed between the drill bit 10 and the drill string 20. In addition, the breakable washer 24 has a second surface 42 having a conical shape (not necessarily planar) at an angle with reference to the first surface 40. In cross section, the breakable washer has a radially diverging configuration. The angle between the surface 40 and the surface 42 must be shallow enough to hold the washer 24 in position between the makeup end 36 and the shoulder 38, typically 15 degrees or less. The preferred angle between the surface 40 and the surface 42 is 5 degrees. If the angle between the two surfaces is too large then the washer 24 will be subject to breakage and will be forced out from between the makeup end 36 and shoulder 38 when the drill bit 10 is made up to the drill string 20.

The technical advantage of the conical shape of the second surface 42 is facilitating the removal of the washer from between the drill bit 10 and the drill string 20. To remove the breakable washer 24 from between the drill bit 10 and the drill string 20, the fracture links 31 and 33 are broken thereby fracturing the washer into pieces. After the washer 24 has been fractured a small movement of the pieces of the washer from between the drill bit 10 and the drill string 20 results in a separation between the surfaces 36 and 40 and the surfaces 38 and 42 thereby enabling easy removal of the washer 24.

Although the invention has been described in detail, it is to be understood that the explanation is by way of illustration an example only and is not to be taken by way of limitation, the spirit and scope of the invention being limited only to the terms of the claims.

What is claimed is:

1. Apparatus for earth boring comprising a tool for attachment to a drill string, comprising:

a tool body having a longitudinal axis and including a makeup end;

a threaded pin extending from and integral with the makeup end of the tool body;

a radially-extending surface at the makeup end of the tool body, the surface extending outward from the threaded pin to an outer surface of the tool body, the radially-extending surface having an angle of less than 15 degrees with respect to a plane perpendicular to the longitudinal axis;

a breakable washer positioned on the radially-extending surface of the tool body, the breakable washer having a radially-extending first surface substantially perpendicular to the longitudinal axis of the tool body and a radially-extending second surface having an angle of less than 15 degrees with respect to a plane perpendicular to the longitudinal axis; and the second surface of the breakable washer being disposed at an angle greater than zero with respect to the first surface of the breakable washer, such that the first and second surface of the breakable washer are not parallel to each other, and a cross-section of the breakable washer is radially diverging.

2. Apparatus for earth boring, as set forth in claim 1, wherein the radially-extending first surface comprises a planar surface.

3. Apparatus for earth boring, as set forth in claim 1, wherein the breakable washer further comprises a substantially ring-shaped configuration having a first breakpoint recess in the outer surface thereof.

4. Apparatus for earth boring, as set forth in claim 3, wherein the breakable washer further comprises a second breakpoint recess in the outer surface of the ring-shaped configuration and circumferentially displaced from the first breakpoint recess.

5. Apparatus for earth boring, as set forth in claim 1, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

6. Apparatus for earth boring, as set forth in claim 5, wherein the breakable washer further comprises a third breakpoint recess in the outer surface of the ring-shaped configuration and circumferentially displaced from the first breakpoint recess, and a fourth breakpoint recess in the inner surface of the ring-shaped configuration positioned opposite from the third breakpoint recess.

7. Apparatus for earth boring comprising a tool for attachment to a drill string, comprising:

a tool body having a longitudinal axis and including a threaded pin at a makeup end;

a radially-extending surface at the makeup end of the tool body and extending outward from the threaded pin to an outer surface of the tool body, the radially-extending surface having an angle of from 5 degrees to 15 degrees from a plane perpendicular to the longitudinal axis of the tool body; and a breakable washer positioned on the radially-extending surface of the tool body, the breakable washer having a radially-extending first surface substantially perpendicular to the longitudinal axis and a radially-extending second surface having an angle of from 5 degrees to 15 degrees with respect to the radially-extending first surface.

8. Apparatus for earth boring, as set forth in claim 7, wherein the radially-extending first surface comprises a planar surface.

9. Apparatus for earth boring, as set forth in claim 7, wherein the breakable washer further comprises a substantially ring-shaped configuration having a first breakpoint recess in the outer surface thereof.

10. Apparatus for earth boring, as set forth in claim 9, wherein the breakable washer further comprises a second breakpoint recess in the outer surface of the ring-shaped configuration and circumferentially displaced from the first breakpoint recess.

11. Apparatus for earth boring, as set forth in claim 7, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

12. Apparatus for earth boring, as forth in claim 11, wherein the breakable washer further comprises a third breakpoint recess in the outer surface of the ring-shaped configuration, and circumferentially displaced from the first breakpoint recess, and a fourth breakpoint recess in the inner surface of the ring-shaped configuration positioned opposite from the third breakpoint recess.

13. A breakable washer for assembly between a tool and a drill string, comprising:

a ring-shaped body having a centerline axis substantially perpendicular to a plane passing through the body, the ring-shaped body comprising:

a radially-extending first surface substantially perpendicular to the centerline axis and a radially-extending second surface, spaced from the first surface and positioned at an angle between 5 and 15 degrees with respect to the plane perpendicular to the centerline axis, and an outer surface extending generally parallel to the centerline axis and connecting the first surface and the second surface; and at least one breakpoint recess in a surface of the ring-shaped body.

14. A breakable washer as in claim 13 wherein the radially-extending first surface comprises a planar surface.

15. A breakable washer as in claim 13 wherein the ring-shaped body further comprises a second breakpoint recess in the outer surface of the ring-shaped body and circumferentially displaced from the first breakpoint recess.

16. A breakable washer as in claim 13 wherein the ring-shaped body further comprises a first breakpoint recess in an outer surface of the ring-shaped body and a second breakpoint recess in an inner surface of the ring-shaped body positioned opposite from the first breakpoint recess.

17. The breakable washer as in claim 16 wherein the ring-shaped body further comprises a third breakpoint recess in the outer surface of the ring-shaped body and circumferentially displaced from the first breakpoint recess and a fourth breakpoint recess in the inner surface of the ring-shaped body positioned opposite from the third breakpoint recess.

18. A breakable washer for assembly between a drill bit and a drill string, comprising:

a ring-shaped body having an interior surface, an exterior surface, and a centerline axis substantially perpendicular to a plane passing through the body, the ring-shaped body comprising:

a radially-extending first surface extending from the interior surface to the exterior surface, and being substantially perpendicular to the centerline axis of the ring-shaped body and a radially-extending second surface, spaced from the first surface and positioned at an angle of from 5 degrees to 15 degrees from a radial axis extending perpendicular to the centerline axis, and a third surface connecting the first surface and the second surface; and at least one breakpoint recess in a surface of the ring-shaped body.

19. Apparatus for earth boring comprising a tool for attachment to a drill string, comprising:

a tool body having a longitudinal axis and including a makeup end;

a threaded pin extending from and integral with the makeup end of the tool body;

a radially-extending surface at the makeup end of the tool body, the surface extending outward from the threaded pin to an outer surface of the tool body, the radially-extending surface having an angle of between 5 and 15 degrees with respect to a plane perpendicular to the longitudinal axis; and a generally ring-shaped breakable washer having at least one breakpoint recess disposed thereupon, and being positioned on the radially-extending surface of the tool body, the breakable washer having a radially-extending surface having an angle of between 5 and 15 degrees with respect to a plane perpendicular to the longitudinal axis and mating with the radially-extending surface of the tool body.

20. Apparatus for earth boring, as set forth in claim 19, wherein the breakable washer further comprises at least a second breakpoint recess in the outer surface of the ring-shaped configuration and circumferentially displaced from the at least one breakpoint recess.

21. Apparatus for earth boring, as set forth in claim 19, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

22. Apparatus for earth boring, as set forth in claim 21, wherein the breakable washer further comprises a third breakpoint recess in the outer surface of the ring-shaped configuration and circumferentially displaced from the first breakpoint recess, and a fourth breakpoint recess in the inner surface of the ring-shaped configuration positioned opposite from the third breakpoint recess.

23. Apparatus for earth boring comprising a tool for attachment to a drill string, comprising:

a tool body having a longitudinal axis and including a threaded pin at a makeup end;

a radially-extending surface at the makeup end of the tool body and extending outward from the threaded pin to an outer surface of the tool body, the radially-extending surface having an angle of from 5 degrees to 15 degrees from a plane perpendicular to the longitudinal axis of the tool body; and a generally ring-shaped breakable washer having a plurality of breakpoint recesses disposed thereupon and being positioned on the radially-extending surface of the tool body, the breakable washer having a radially-extending surface having an angle of from 5 degrees to 15 degrees with respect to a plane perpendicular to the longitudinal axis and mating with the radially-extending surface of the tool body.

24. Apparatus for earth boring, as set forth in claim 23, wherein the breakable washer further comprises a substantially ring-shaped configuration having a first breakpoint recess in the outer surface thereof.

25. Apparatus for earth boring, as set forth in claim 24, wherein the breakable washer further comprises a second breakpoint recess in the outer surface of the ring-shaped configuration and circumferentially displaced from the first breakpoint recess.

26. Apparatus for earth boring, as set forth in claim 23, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

27. Apparatus for earth boring, as forth in claim 26, wherein the breakable washer further comprises a third breakpoint recess in the outer surface of the ring-shaped configuration, and circumferentially displaced from the first breakpoint recess, and a fourth breakpoint recess in the inner surface of the ring-shaped configuration positioned opposite from the third breakpoint recess.

28. Apparatus for earth boring comprising a tool for attachment to the makeup end of a drill string, comprising:

a tool body having a longitudinal axis and including a makeup end;

a threaded pin extending from and integral with the makeup end of the tool body;

a radially-extending surface at the makeup end of the drill string, the surface extending to an outer surface of the drill string, the radially-extending surface having an angle of between 5 and 15 degrees with respect to a plane perpendicular to the longitudinal axis of the tool body; and a breakable washer between the makeup end of the tool body and the makeup end of the drill string, the breakable washer having a radially-extending first surface substantially perpendicular to the longitudinal axis of the tool body and a radially-extending second surface having an angle of between 5 and 15 degrees with respect to a surface perpendicular to the longitudinal axis.

29. Apparatus for earth boring, as set forth in claim 28, wherein the radially-extending first surface comprises a planar surface.

30. Apparatus for earth boring, as set forth in claim 29, wherein the breakable washer further comprises a substantially ring-shaped configuration having a first breakpoint recess in the outer surface thereof.

31. Apparatus for earth boring, as set forth in claim 30, wherein the breakable washer further comprises a second breakpoint recess in the outer surface of the ring-shaped configuration and circumferentially displaced from the first breakpoint recess.

32. Apparatus for earth boring, as set forth in claim 28, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

33. Apparatus for earth boring, as forth in claim 32, wherein the breakable washer further comprises a third breakpoint recess in the outer surface of the ring-shaped configuration and circumferentially displaced from the first breakpoint recess, and a fourth breakpoint recess in the inner surface of the ring-shaped configuration positioned opposite from the third breakpoint recess.

34. Apparatus for earth boring comprising a tool for attachment to a makeup end of a drill string, comprising:

a tool body having a longitudinal axis and including a threaded pin at a makeup end;

a radially-extending surface at the makeup end of the drill string and extending outward to an outer surface of the drill string, the radially-extending surface has an angle of from 5 degrees to 15 degrees from a plane perpendicular to the longitudinal axis of the tool body; and a breakable washer between the make-up end of the tool body and the makeup end of the drill string, the breakable washer having a radially-extending first surface substantially perpendicular to the longitudinal axis and a radially-extending second surface having an angle of from 5 degrees to 15 degrees with respect to the radially-extending first surface.

35. Apparatus for earth boring, as set forth in claim 34, wherein the radially-extending first surface comprises a planar surface.

36. Apparatus for earth boring, as set forth in claim 35, wherein the breakable washer further comprises a substantially ring-shaped configuration having a first breakpoint recess in the outer surface thereof.

37. Apparatus for earth boring, as set forth in claim 36, wherein the breakable washer further comprises a second breakpoint recess in the outer surface of the ring-shaped configuration and circumferentially displaced from the first breakpoint recess.

38. Apparatus for earth boring, as set forth in claim 34, wherein the breakable washer further comprises a substantially ring-shaped configuration having a first breakpoint recess in the outer surface thereof, and a second breakpoint recess in the inner surface of the ring-shaped configuration positioned opposite from the first breakpoint recess.

39. Apparatus for earth boring, as forth in claim 38, wherein the breakable washer further comprises a third breakpoint recess in the outer surface of the ring-shaped configuration, and circumferentially displaced from the first breakpoint recess, and a fourth breakpoint recess in the inner surface of the ring-shaped configuration positioned opposite from the third breakpoint recess.

* * * * *